(12) United States Patent
Langius et al.

(10) Patent No.: US 9,442,992 B2
(45) Date of Patent: Sep. 13, 2016

(54) ACCESS SYSTEM AND METHOD FOR ACCESSING SIGNAL DATA

(75) Inventors: Erik Alle Fokko Langius, Delft (NL); Bram Dirk Van Der Waaij, Delft (NL); Matthijs Raymond Vonder, Delft (NL); Allart Bastiaans, Delft (NL); Wiltfried Pathuis, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 205 days.

(21) Appl. No.: 14/232,169

(22) PCT Filed: Jul. 11, 2012

(86) PCT No.: PCT/NL2012/050498
§ 371 (c)(1),
(2), (4) Date: Mar. 21, 2014

(87) PCT Pub. No.: WO2013/009179
PCT Pub. Date: Jan. 17, 2013

(65) Prior Publication Data
US 2014/0289275 A1  Sep. 25, 2014

(30) Foreign Application Priority Data
Jul. 11, 2011 (EP) .................... 11173419

(51) Int. Cl.
*G06F 17/30* (2006.01)
(52) U.S. Cl.
CPC ... *G06F 17/30542* (2013.01); *G06F 17/30389* (2013.01)

(58) Field of Classification Search
USPC ......................... 707/769, 780, 758
See application file for complete search history.

(56) References Cited

U.S. PATENT DOCUMENTS 6,477,534 B1 * 11/2002 Acharya ........... G06F 17/30457
6,816,551 B1 * 11/2004 Kasutani ........... G06F 17/30825
                                                               375/240.08
7,236,971 B1   6/2007 Shatdal et al.

OTHER PUBLICATIONS

Amol Deshpande et al. "MauveDB", ACM SIGMOD International Conference on Management of Data, Jun. 27-29, 2006, Chicago, USA.*
Arvind Thiagarajan et al: "Querying continuous functions in a database system", Proceedings of the 2008 ACM SIGMOD International Conference on Management of Data , SIGMOD '08, Jan. 1, 2008, p. 791, XP55020832, New York, New York, USA.

(Continued)

*Primary Examiner* — Hung T Vy
(74) *Attorney, Agent, or Firm* — Banner & Witcoff, Ltd.

(57) ABSTRACT

Signal data from a sensor is stored in a storage device. The signal data is accessed by means access request that includes an identification of a base signal that may indicate the signal data from said sensor and an identification of a derivation to obtain a requested signal from the base signal. An interface extracts the identifications of the base signal the derivation. The interface tests whether stored signal data obtained from the base signal by said derivation is available in the storage device, and if so it returns the stored signal data in response to the access request via the interface. If not signal data is derived from further stored signal data by at least one signal processing operation identified in the derivation.

13 Claims, 3 Drawing Sheets

(56) References Cited

OTHER PUBLICATIONS

Leonore Zink: "Einbettung von Interpolationsfunktionen in die Datenbanksprache SQL—Datenbankunterstutzung fur die Umweltforschung" In: "Einbettung von Interpolationsfunktionen in die Datenbanksprache SQL—Datenbankunterstutzung fur die Umweltforschung", Jan. 1, 2000, Fakultat Informatik der Universitat Stuttgart, XP55020829.
Dar S et al: "Semantic Data Caching and Replacement", Proceedings of the International Conference on Very Largedata Bases, Jan. 1, 1996, pp. 1-12, XP002261689.
Extended European Search Report—EP11173419.0—Mailing Date: Mar. 21, 2012.
International Search Report—PCT/NL2012/050498—Mailing Date: Oct. 5, 2012.
Anastasia Ailamaki et al: "Managing scientific data", Communications of the ACM. vol. 53. No. 6, Jun. 1, 2010, p. 68. XP55037551.
"Incremental backup", Wikipedia, May 7,2012. XP002684006. Retrieved from the Internet: URL:http://en.wikipedia.org/w/index.php?title=Incremental backup&oldid=491157485 [retrieved on Sep. 7, 2012].
Peter Buneman et al: "Archiving scientific data", Proceedings of the 2002 ACM SIGMOD International Conference on Management of Data, SIGMOD '02, Jan. 1, 2002. p. 1, XP55037550, New York. New York. USA, DOI: 10.1145/564691.564693, ISBN: 978-1-58-113497-1.
Bhargav Kanagal et al: "Online Filtering, Smoothing and Probabilistic Modeling of Streaming data", Data Engineering. 2008. ICDE 2008. IEEE 24th International Conference on. IEEE. Piscataway. NJ. USA. Apr. 7, 2008. pp. 1160-1169. XP031246074. ISBN: 978-1-4244-1836-7.
Amol Deshpande et al: "MauveDB". Proceedings of the 2006 ACM SIGMOD International Conference on Management of Data • SIGMOD '06. Jun. 27, 2006-Jun. 29, 2006. p. 73. XP055020827. Chicago. USA, DOI: 10.1145/1142473.1142483 ISBN: 978-1-59-593434-5.
Andrade H et al: "Optimizing the Execution of Multiple Data Analysis Queries on Parallel and Distributed Environements", IEEE Transactions on Parallel and Distributed Systems. IEEE Service Center. Los Alamitos. CA. US. vol. 15. No. 6. Jun. 1, 2004, pp. 520-532. XP011111874. ISSN: 1045-9219. DOI: 10.1109/TPDS.2004.11.

\* cited by examiner

ACCESS SYSTEM AND METHOD FOR ACCESSING SIGNAL DATA

CROSS-REFERENCE TO RELATED APPLICATIONS

This application is a U.S. National Stage application under 35 U.S.C. §371 of International Application PCT/NL2012/050498 (published as WO 2013/009179 A1), filed Jul. 11, 2012, which claims priority to Application EP 11173419.0, filed Jul. 11, 2011. Benefit of the filing date of each of these prior applications is hereby claimed. Each of these prior applications is hereby incorporated by reference in its entirety.

FIELD OF THE INVENTION

The invention relates to an access system for accessing signal data and to a method of providing access to signal data.

BACKGROUND

Conventionally, signal data obtained from signals such as electrical signals is stored after sampling the signal and digitizing the samples of the signal. A signal is a time/space position dependent phenomenon. When the signal is a temporal signal, the signal may be sampled at discrete time points. When the signal is a spatial signal, the signal may be sampled at discrete spatial points. The stored signal data may subsequently be used for processing, for example by applying filter operations, interpolation, extrapolation etc. Often only signal data for a limited window of time or space positions is kept in store for this purpose. Storage space requirements rise with the size of the window, and they can become a significant burden if no severe limitation is imposed on the window size.

U.S. Pat. No. 7,236,971 discloses a database system with a data base of signal data. The system is capable of performing interpolation (e.g., temporal interpolation) of signal data from the data base in response to receiving a database query. In one implementation, the database query contains an interpolation function. This system makes it possible to deliver different versions of the data, interpolated in different ways, based on the stored signal data.

Caching of interpolated signal data is described in an article by Deshpande et al, titled "MauvDB", published at the ACM Sigmod International conference on management of data June 2006, Chicago, page 73-84 (EPO reference XP55020827). Deshpande et al describe a database system that supports queries that define results consisting of processed data, such as interpolated and fitted data, derived from raw data in the database, or a result of other queries. Deshpande et al mention an efficiency problem due to the fact that every time that a new value is added to the database a complete rescan of all the data may be needed. To solve this problem, Deshpande et al mention the possibility of caching earlier results, so that only values associated with the newly added data need to be computed. Deshpande et al also disclose that the queries could define different operation for different data partitions, for example different regression functions to be used for different time steps.

The database could be used to store the original signal data of a signal as well as signal data obtained by processing the signal, so that repeated processing can be avoided when the processed data is needed repeatedly. However, this may add to the burden of storage space requirements.

Semantic caching, i.e. caching intermediate results in combination with information how the results have derived is known from articles by Andrade et al and Dar et al. The article by Andrade et al is titled "Optimizing the execution of multiple data analysis queries on parallel and distributed environments, published in the IEEE Transactions on parallel and distributed systems Vol 15 15 No 6 pages 520-532 (EPO reference XP011111874). The article by Dar et al is titled ""Semantic data caching and replacement" published in the Proceedings of the International Conference on very large databases 1996 pages 1-12 (EPO reference XP002261689).

SUMMARY

Among others, it is an object to provide an access system and method that provides for delivery of different versions of signal data in a way in which an increase in storage space requirements is reduced.

An access system for accessing signal data is provided, the access system comprising a connection to a storage device;

a signal processing circuit;

an interface configured to receive an access request for a requested signal having signal values for a series of signal points, and to extract, from the access request, an identification of a base signal and an identification of replacement of signal values for individual signal points by replacement values to obtain a requested signal from the base signal, wherein the interface is configured to test whether stored signal data defining replacements of signal values for individual signal points or ranges of signal points within said series is available in the storage device, and if so to include the stored signal data in a response to the access request for a part of the signal points or ranges of signal points for which said stored signal data is available, and to cause the signal processing circuit to retrieve further stored signal data defined for the base signal and to include, from the signal processing circuit in the response to the access request, the retrieved further stored signal data for a further part of the signal points or ranges of signal points outside the part of the signal points or ranges of signal points for which said stored signal data is available.

By specifying access requests in terms of a base signal and replacements, it is made possible to provide for systematic used of stored replacement values of signal data. The base signal may be a time dependent signal for example. A plurality of base signals may be stored in the storage device, the access request indicating which signal is accessed. Names to identify different base signals may be chosen when they are stored, for example. The interface tests whether replacement values for the base signal are available in the storage device for individual signal points or ranges of signal points and returns the stored signal data in response to the access request for a part of the signal points or ranges of signal points for which said stored signal data is available, and return the base signal data for a further part of the signal points or ranges of signal points. A signal point may be a time point for example and a range of signal points may be a time range. By testing for the availability at different signal points or ranges, use of stored signal data is possible even if replacement signal data is not available for all signal points. Stored replacement data may be used for signal points for which it is available for example, or for ranges in which it is available for all points in the range.

In an embodiment the derivation is specified as a series of successive replacements. In this case stored intermediate replacement signal data may be used. For different signal points or ranges, different intermediate signal data may be used. When no intermediate replacements are available, the base signal itself may be used.

In an embodiment the access request may indicate a border between signal point ranges in which different derivations must be used to obtain the requested signal. On one side of the border an original signal may be used for example and on the other side a simulated signal. In this case at least on one side the signal data may be derived to reduce storage requirements. In a further embodiment the replacements on both sides may be specified in the access request and used to attempt retrieval An access system for accessing signal data is provided, the access system providing for a definition of a signal version in terms of a base signal with signal values for signal points stored in a storage device; and a set of replacement values for individual ones of the signal points stored in the storage device, the access system comprising
  a connection to the storage device;
  a signal processing circuit;
  an interface configured to receive an access request for the signal version, to test, in response to the access request, whether stored signal data defining the replacement of signal values for individual signal points or ranges of signal points within said series is available in the storage device, and if so to include the stored signal data in a response to the access request for a part of the signal points or ranges of signal points for which said stored signal data is available, and to cause the signal processing circuit to retrieve further stored signal data defined for the base signal and to include, from the signal processing circuit in the response to the access request, the retrieved further stored signal data for a further part of the signal points or ranges of signal points outside the part of the signal points or ranges of signal points for which said stored signal data is available.

An access method is provided for accessing signal data, which makes use of a definition of a signal version in terms of a base signal with signal values for signal points stored in a storage device; and a set of replacement values for individual ones of the signal points stored in the storage device, the method comprising
  receiving an access request for the signal version,
  to test, in response to the access request, whether stored signal data defining the replacement of signal values for individual signal points or ranges of signal points within said series is available in the storage device, and if so to include the stored signal data in a response to the access request for a part of the signal points or ranges of signal points for which said stored signal data is available, and
  to cause the signal processing circuit to retrieve further stored signal data defined for the base signal and to include, from the signal processing circuit in the response to the access request, the retrieved further stored signal data for a further part of the signal points or ranges of signal points outside the part of the signal points or ranges of signal points for which said stored signal data is available.

The signal version may be defined recursively, the base signal being another signal version defined with a further set of replacement values. In this case the last replacement in the recursive series versions may be used.

BRIEF DESCRIPTION OF THE DRAWING

These and other objects and advantageous embodiments will become apparent from a description of exemplary embodiments, using the following figures.

DETAILED DESCRIPTION OF EXEMPLARY EMBODIMENTS

Figure 1:
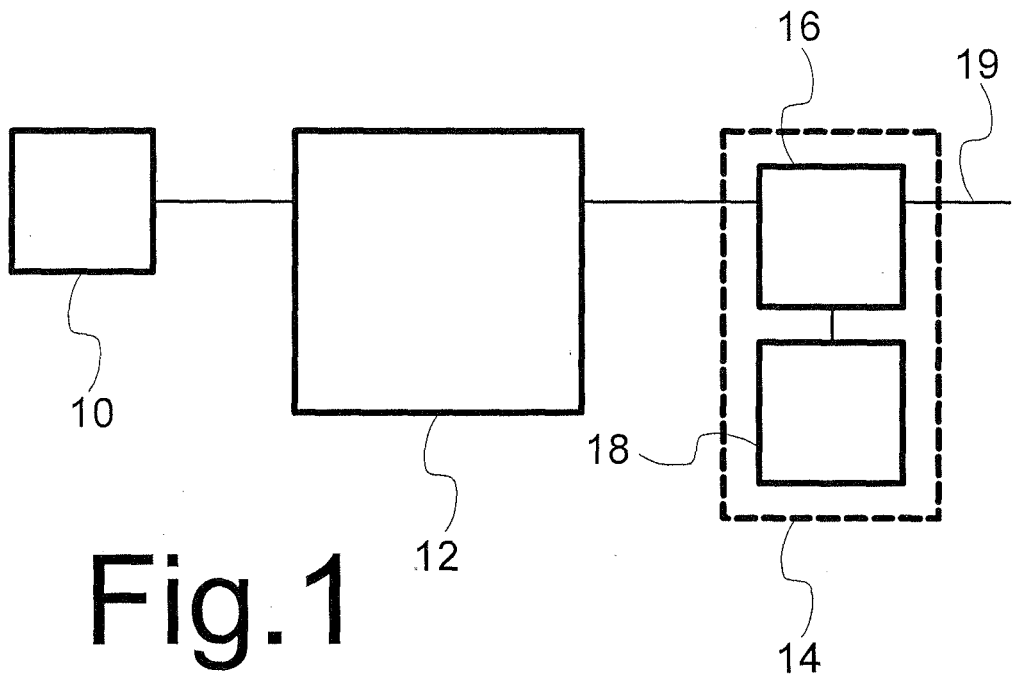
FIG. 1 shows a signal processing system

FIG. 1 shows a signal processing system comprising a signal acquisition device 10, a data storage device 12, and an access system 14. By way of example, signal acquisition device 10 is shown coupled directly to storage device 12, but alternatively is may be coupled to storage device 12 via access system 14. Access system 14 comprises an interface 16 and a processor 18. Interface 16 is coupled to storage device 12, processor 18 and a connection 19 for receiving and servicing access requests. Although interface 16 and processor 18 are shown as distinct modules, and they may be implemented using distinct circuits, it should be appreciated that interface 16 and processor 18 may be implemented as respective computer program modules running on the same processing system. Instructions of these modules may be provided stored on a computer readable medium like a disk (e.g. optical or magnetic disc) or a semi-conductor memory. This processing system may be a programmable computer, which may be designed to execute the modules in a centralized or distributed way, using a plurality of programmable processor circuits. Although storage device 12 is shown external to access system 14, coupled to it via an external connection, it should be appreciated that storage device 12 may be part of access system 14, coupled to other parts of the access system 14 via one or more internal connections. Signal acquisition device 10 may comprise one or more sensors, such as a pressure sensor (more specifically a microphone), a temperature sensor, a current or voltage sensor etc.

In operation a signal acquisition device 10 may receive a signal, such as a time dependent electrical signal, optionally obtained by converting another physical signal such as a sound signal (pressure variation), a light signal or other electromagnetic wave signal etc to an electrical signal in a detector (not shown). Alternatively, signal acquisition device 10 may receive a spatial position dependent signal, for example from a spatial array of detectors, or a time and spatial position dependent signal. Signal acquisition device 10 samples and digitizes the signal and stores the resulting signal data, typically comprising a series of numbers in storage device 12. Access system 14 receives requests for access to signal data from connection 19. Access system 14 responds to these requests by retrieving signal data from storage device 12 and optionally by causing processor 18 to process the retrieved signal data. Access system 14 returns the retrieved and optionally processed signal data to connection 19.

Figure 2:
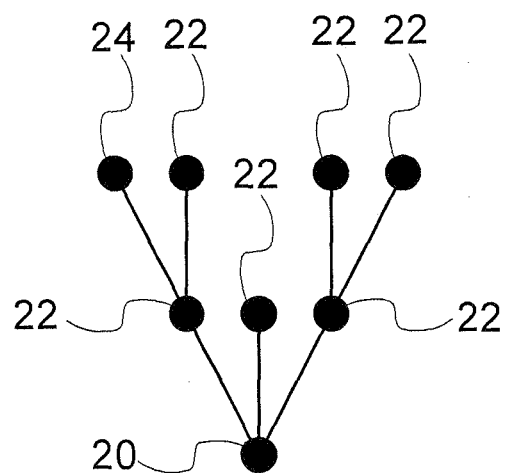
FIG. 2 shows a tree structure
  FIG. 2a show an example of a plurality of levels of signal versions

Interface 16 provides for handling of access requests that identify "time lines" of signal data in terms of the derivation of the requested signals data. The derivation of signal data can be viewed in terms of a tree structure as shown in FIG. 2. The tree has a root node 20, and branches from root node 20 to child nodes 22. In turn the child nodes 22 may have branches to other child nodes 22, 24. Root node 20 represents root signal data provided by signal acquisition device 10 on the basis of a received signal. Child nodes 22, 24 represent derived signal data resulting from the application of signal processing operations or changes to the root signal data. Each signal processing operation transforms input signal values for a series of time/space points into output signal values for a series of time/space points. Changes may comprise replacement of signal values for selected time/space points by replacement values, leaving the signal values for other time/space points unchanged.

The derived signal data may be the result of cascaded application of different signal processing operations or changes, each successive signal processing operation or change having the output signal of the preceding signal processing operation as input signal. Such a cascaded application is symbolized by successive branches in the tree from root node 20 to the particular child node 24 that represents the signal resulting from the cascaded operations. Successive child nodes 22 along these successive branches from root node 20 to a particular child node 24 represent successive intermediate signals that serve as input signal for the successive signal processing operations in the cascade.

Interface 16 provides for handling of access requests that identify a time and/or space point range for which signal data is needed and "time lines" of signal data in terms of the relation of the requested signals data to the root signal data symbolized by root node 20. The relation may be indicated for example by a series of labels that identify the signal processing operations in the derivation or files that define changes in the derivation (collectively also called derivation types of the operations, or derivation operation types).

Furthermore, the access requests may specify points of transitions (e.g. time points) between ranges of points wherein different derivations should be used. The access request may indicate for example that the requested signal should be signal data of a first signal corresponding to a first child node 22 up to a specified time point and that subsequent to that time point the requested signal should be signal data extrapolated (simulated) under specified conditions on the basis of the first signal up to the specified time point. Such this type of specification of a transition will also be referred to as a derivation (operation) type.

The root signal data symbolized by root node 20 is kept stored in storage device 12. Furthermore, derived signal data symbolized by child nodes 22 may be kept stored in storage device 12, optionally only for subsets of time and/or space points for which the derived signal is defined.

When interface 16 receives a request for signal data of a derived signal corresponding to a child node 22, or a combination of signals corresponding to different child nodes 22, with transitions between the signals at specified time/space points, interface 16 retrieves the requested signal data from storage device 12 as much as possible and commands processor 18 to compute the remaining signal data from stored signal data for intermediate child nodes 22 between the child node(s) of the requested signal and root node 20, or from the root signal data, whichever is available.

Figure 2A:
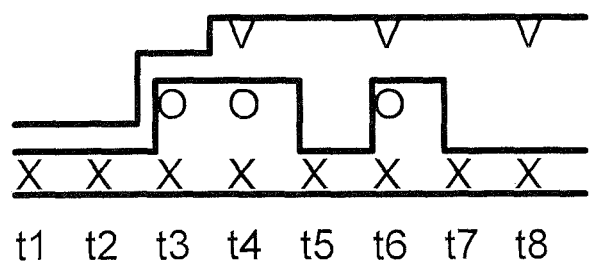

FIG. 2a shows an example of signal data resulting from the application of changes to the root signal data. As noted, changes may comprise replacement of signal values for selected time/space points by replacement values, leaving the signal values for other time/space points unchanged. The time/space points will be referred to by the generic term "signal points" Different nodes in the tree may represent different changes for the signal points, which result in different signal versions. In this way, a plurality of levels of signal versions may arise. At a bottom line in FIG. 2a there is a base signal line indicating a base signal. It represents raw data measurements for a series of signal points, which can be directly extracted from the database. The "x" symbol represents every raw measurement that is stored at the storage device. By way of example the measurements are arranged from right to left in ascending order with respect to time or space, for example, evenly spaced from time t1 to t8.

Above the base signal line a second line of signal points is shown. It contains signal values for a limited number of signal points marked be symbol "o" which are stored in the storage device to define an independent version of the signal. The signal values may be raw measurement signal points that are needed in order to respond to a request for a first adapted version of the base signal. An identification of this second data line contains the signal values for a limited number of signal points and a pointer to the base signal data line from which it is derived. If an access request requires signal values for signal points to be provided from the second line, data from that line will be provided, except for signal points where no such data is available. In the latter case data from the base signal is provided.

When signal lines at more levels are used, if a signal value for a signal point cannot be found at a level, the signal value for that signal point is extracted from a next lower level, and if it cannot be found there at the second next lower level and so on until the base signal line is reached.

There are situations wherein it may be is needed to stop the process of combining different levels at some signal point in the signal as a function of time or space. For instance, it may be undesirable to use stored predicted values merged with newly received signal data. Typically, the a signal point, i.e. location, time, etc. in the prediction or simulation is the point on which the combination of levels should be stopped. From that point further the derivation is no longer merged with its parent, it forks and becomes the base signal for its potential children. An indication of that point may be saved as a part of the identification of the derivation.

In FIG. 2a an example of derivation forking is demonstrated wherein a time point is used. Above the second signal line a third signal line is shown with a limited number of values marked with "V" symbol. "V" values represent independent versions of signal points of the second signal line which may be used to respond to a further request. An definition of the further request contains the pointer to signal version from which it is derived (e.g. corresponding to the second line). In the FIG. 2a a special start point t4, marked by "V", indicates the end point of merging of the parent derivations.

Processing the further request comprises two steps: up to time point t4 merging is performed as described above. From t4 and later times, the merging stops and exclusively the available V points are returned.

After obtaining the signal values of the requested signal, operation techniques, such as interpolation, aggregation, etc. may be applied to the signal formed by the values and the result can be returned to complete a response to a request.

Figure 3:
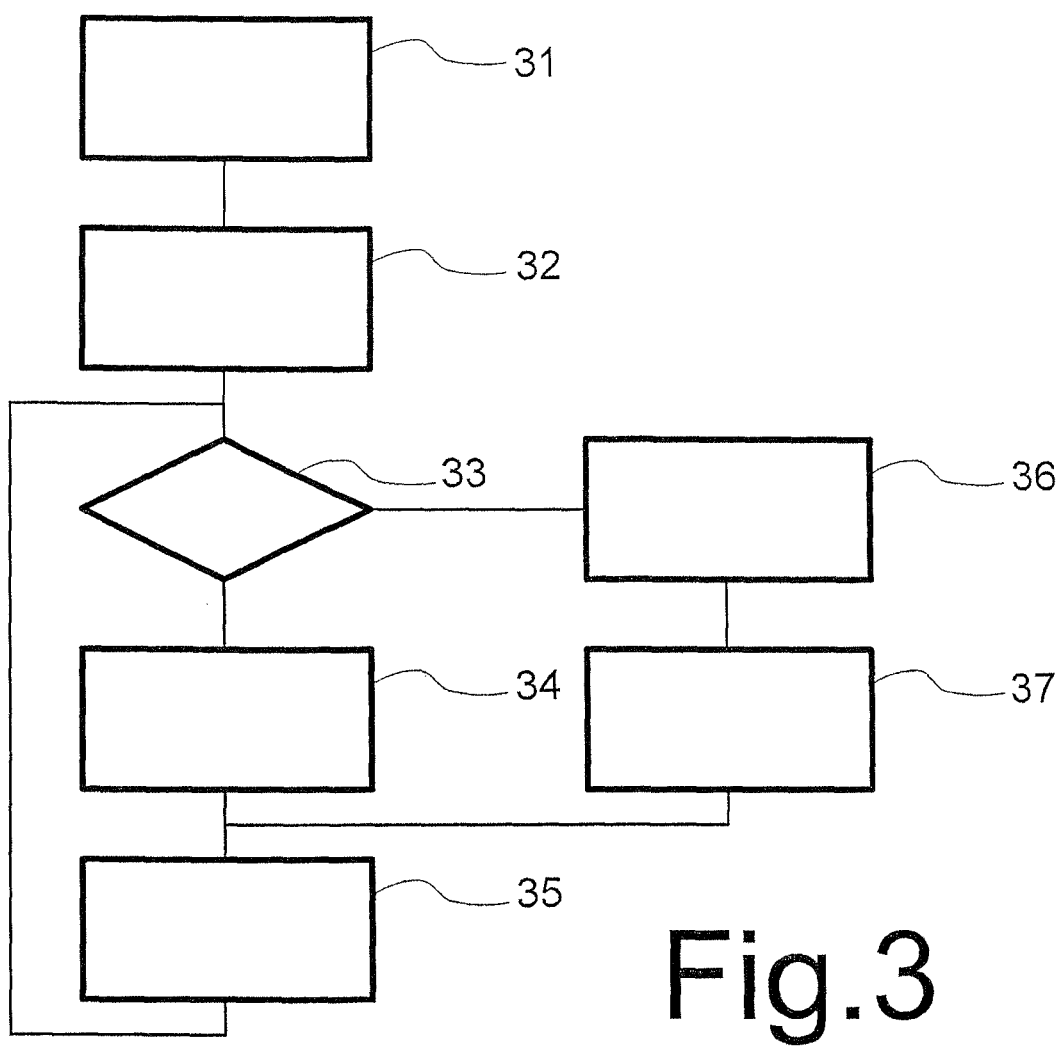
FIG. 3 shows a flow chart of operation of an access system

FIG. 3 shows a flow chart of operation of interface 16. By way of example the flow chart will be described for time dependent signals. Although the operation is described in terms of interface 16, it should be appreciated that interface 16 may be implemented partly or wholly as a program running on processor 18, so that some or all of the steps may be performed by processor 18 even if it is described that they are performed by interface 16. In a first step 31, interface 16 receives a request for signal data and extracts parameters from the request. Interface 16 may extract
(a) a time range specified in the request,
(b) a root signal specified in the request,
(c) an identification of the derivation of the requested signal from the root signal.

The derivation may be specified as a series of derivation operation types that may be successively applied to the root signal to obtain the derived signal. In a second step 32, interface 16 selects a first time point from the specified time range. In a third step 33, interface 16 determines whether signal data for the selected time point is available in storage device 12 for the specified derivation from the specified root signal. If so, a fourth step 34 is executed wherein interface 16 adds the signal data from the storage device 12 to the return signal in response to the request.

From fourth step 34 interface 16 proceeds to fifth step 35 where a next time position is selected and the process repeats from third step 33, unless all time positions have been selected, in which case the process finishes, the signal data being made available via connection 19 if this has not already been done in fourth step 34.

If interface 16 determines in third step 33 that signal data for the selected time point is not available in storage device 12 for the specified derivation from the specified root signal, interface 16 executes a sixth step 36 wherein it causes processor 18 to determine this signal data from signal data stored in storage device 12 for a preceding level of the derivation. Derivation levels can be explained in terms of the tree of FIG. 2. Each node 20, 22, 24 in the tree corresponds to a respective signal. The direct child nodes 22 of the root node 20 correspond to signals obtained by applying derivation operations of respective derivation operation types to the signal of the root node 20. In turn further child nodes 22, 24 of child nodes correspond to signals obtained by applying respective derivation operations to the latter. Thus, each child node 24 corresponds to a signal obtained by a applying a series of derivation operations successively to the root node 20, the intermediate nodes 22 between that node 24 and the root node 20 represent successive derivation levels. If the derivation identified in the request corresponds to a particular child node 24, interface 16 will use signal data corresponding to a lower child node 22 or root node 20, along a path of branches between the particular node 24 and root node 20. A recursive process is used, which will be explained with the aid of FIG. 4. From sixth step 36 interface 16 proceeds to a seventh step 37 in which interface 16 adds the computed signal data to the return signal in response to the request. From seventh step 37 interface 16 proceeds to fifth step 35.

Figure 4:
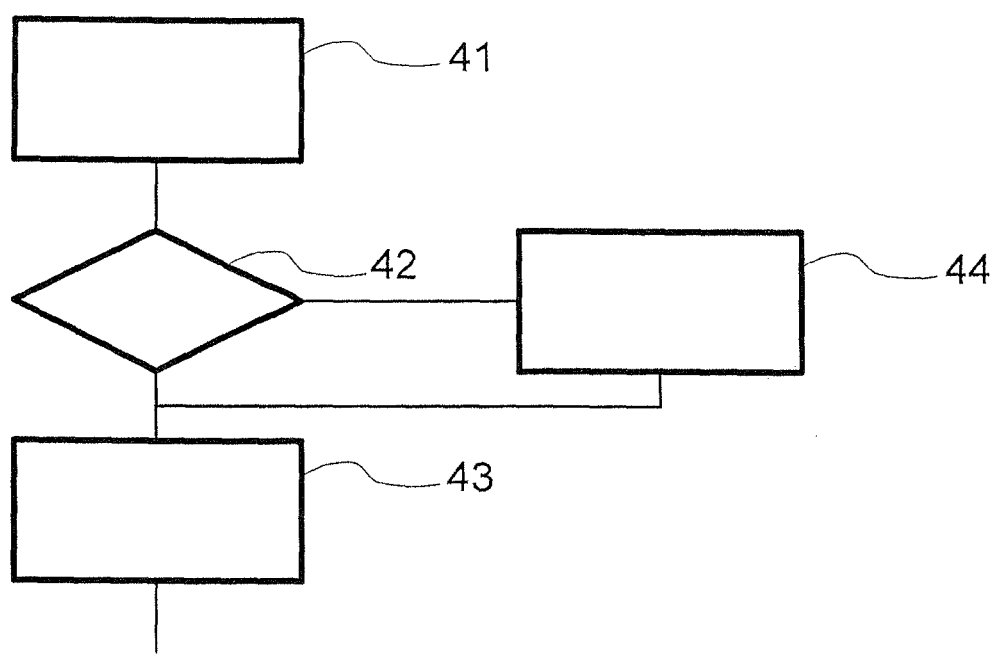
FIG. 4 illustrates a computation

FIG. 4 illustrates the determination used to implement sixth step 36. For the sake of exposition, an embodiment will be described wherein this determination is performed for an individual time position, but it should be appreciated that the determination may be performed for blocks of time positions. In the embodiment, the determination is performed for a selected time position and a current derivation defined by a current recursion level. At the initial recursion level the time point is the time point selected in second step 32 or fifth step 35 of the process of FIG. 3, and the current derivation is the derivation identified in the access request.

In a first step 41 interface 16 determines the next lower derivation preceding the current derivation. In terms of the tree of FIG. 3, if the derivation identified in the request corresponds to a particular child node 24, interface 16 will determine the derivation corresponding to the next lower child node 22 or the root node 20 if that is the next lower node.

In a second step 42, interface 16 determines whether storage device 12 has sufficient stored signal data available for the next lower derivation to determine the signal data for the selected time position and the current derivation, using the last derivation operation type in the series of derivation operation types that defines the derivation. If so, interface 16 proceeds to a third step 43, wherein it supplies the available signal data to processor 18 and causes processor 18 to determine the signal data for the selected time position and the current derivation. If the last derivation operation type in the series is a signal processing operation, processor 18 executes one or more arithmetic operations with signal values as operands, as defined by the derivation operation type. If the last derivation operation type is a change of the signal, processor 18 uses the derivation operation type to retrieve an update file with changed values, and determines the changed value, if any, for the selected time position from the update file.

If second step 42 indicates that storage device 12 has insufficient stored signal data, interface 16 proceeds to a fourth step 44, wherein the process of FIG. 4 is executed at a next lower recursion level for each of the time positions where no stored signal data for the current derivation level is available in storage device 12. In the next lower recursion level, the next lower derivation of the current recursion level becomes the current recursion level.

From fourth step 44, interface 16 proceeds to third step 43, using the signal data that has been determined to supplement, and if necessary entirely supply, the signal data needed for the computation of the signal data. As will be appreciated, the number of recursion levels that is needed depends on what is stored in storage device 12. Ultimately, the recursions will bottom out at the level of root node 20. If sufficient stored signal data is available at the root node 20, this data is returned. Otherwise the request fails.

In many cases, signal data will be available in storage device in a first range of time positions and not in a second range of time positions. Hence third step 33 of the process of FIG. 3 and second step 42 of the process of FIG. 4 will find a switch between availability and unavailability or vice versa once a border between the time ranges is crossed. This means that each flow chart may be split in two versions, for time points on respective sides of the border respectively. A step of testing whether selection of a time point causes the border to be crossed and switching between the versions is added.

As noted, the recursive process of FIG. 4 may be performed for blocks of time positions, for example when it involves execution of arithmetic operations applied to signal values. In this case second step 42 involves a determination whether storage device 12 has sufficient stored signal data available for the next lower derivation to compute the signal data for the time position in the block. Third step 43 involves causing processor 18 to compute the signal data for the time position in the block, all for the current derivation. Fourth step 44 involves the next lower recursion level for a block or blocks including time positions where no stored signal data for the current derivation level is available in storage device 12. Block based computation may be used to reduce overhead involved with separate signal computations for individual time points.

If stored signal data at one level is available for part of the time points but not for another part of the time points (or ranges of time points), the signal data for different time points (or time ranges) may be derived by applying signal processing operations starting from mutually different levels. In this case it may be desirable to reduce transition effects, for example by fading out one method of computation as a function of time while fading in the other.

Optionally, this identification of the derivation may comprise parameters of the derivation, or more particularly, parameters to be used by signal processing operations from which the derivation is composed, such as filter bandwidth values etc. In this case, these parameters will be used to derive the signal. Optionally, these parameters may also be recorded for stored signal data and used in the comparison to determine whether stored signal data according to the derivation is available in storage device 12. However, in another embodiment the attempt to retrieve derived signal data may be skipped altogether in the case of parameter dependent data, the data always being derived in response to the access request.

In an embodiment interface 16 is configured to handle requests that identify different derivations to be used to derive the signal data for different ranges of time points. In this embodiment interface 16 is configured to extract, in first step 31, (d) if present in the request, a specification of a time point of transition, and (e) if present in the request, an identification of the derivation of the requested signal from the root signal after the time point of transition In this embodiment, sixth step 36 involves that interface 16 causes processor 18 to compute the signal data with either the extracted derivation under (c) or (e) dependent on whether the selected time point is before the time point of transition or not. Similarly, in third step 33, the determination whether signal data for the selected time point is available in storage device 12 for the specified derivation from the specified root signal uses the derivation extracted under (c) or (e) dependent on whether the selected time point is before the time point of transition or not.

In some cases, the derived signal data after the time point of transition may depend on the value of the time point of transition. For example, if the signal data is extrapolated signal data, the value of the extrapolated signal data at a time point may depend on where the extrapolation has started. In the latter case, interface 16 may also be configured to test whether, if signal data for the selected time point is available in storage device 12, that signal data has been derived using the same time point of transition. If not, the process may be executed from sixth step 36. In an embodiment, third step 33 may comprise always proceeding to sixth step 36 if the selected time point is not before the time point of transition.

In another embodiment the requests may comprise different derivations for different time ranges. In this embodiment interface 16 may be configured to extract, in first step 31, (a') one or more time ranges specified in the request, (b) a root signal specified in the request, (c') one or more identifications of the derivation of the requested signal from the root signal.

In this embodiment, sixth step 36 involves that interface 16 determines the specified time range that contains the selected time point and that interface 16 causes processor 18 to compute the signal data with the extracted derivation for that time range.

Interface 16 may be configured to store the derived signal data in storage device 12, for example in seventh step 37. Thus, it may later be used to service a subsequent access request. In this embodiment interface 16 records an identification of the parent node 20, 22 from which the signal data has been derived and an identification of the derivation (e.g. in terms of a series of derivation operation types from the root node, or a last one of this series of derivation operation types and a reference to the next parent node in the path from the node to the root node). This information is recorded in association with the stored derived data, so that is suitable for use in third step 33, to determine whether signal data for the selected time point is available in storage device 12 for a specified derivation from the specified root signal, and to retrieve this stored signal data. If the results of the derivation depend on the time point of transition or time ranges, these are also recorded for use in third step 33.

Interface 16 may be configured to store this information in response to a command, for example an indication in the access request that new signal data that results from the access request must be stored in storage device 12. In another embodiment, interface 16 may be configured to manage storage automatically. Interface 16 may be configured to store all derived signal data, or derived signal data for a predetermined set of derivations for example. In a further embodiment, interface 16 may be configured to remove derived signal data automatically from storage device 12, for example using cache management like techniques, such as a "least recently used" test to select derived signal data for removal. However, preferably interface 16 is configured to exclude all signal data for each root node 20 from selection of signal data to be removed. Thus, it will always be possible to reconstruct the signal data. In a further embodiment interface 16 is configured to exclude predetermined signal data from selection of signal data to be removed. Thus for example, signals data at a predetermined sampling rate etc may be excluded.

The root signal data may be data output from a sensor, but instead it may be a derived signal itself, which has been given a name from which its derivation cannot be derived, at least not in a way that allows processor 18 to be controlled to execute the derivation. As used herein an indication of a derivation should indicate the operation types in a way that allows processor 18 to be controlled automatically to execute the derivation.

As described, one form of derivation provides for changes of signal values, that is, replacement of signal values of a base signal by replacement values. In this case, third step 33 comprises retrieving the changed signal values from storage device 12 for signal points for which stored replacement values are available and sixth step 36 comprises retrieving signal values of a predecessor signal for signal points for which the signal value is not changed. If a node in the tree corresponds to change of signal; values only for a limited number of signal points (e.g. only for a number of time or space points), storage device 12 need store only the changed values for the changed signal. The derivation defines a version of a signal with signal values from the base signal, except at time or space points where replacement values are defined.

The replacement values may be results of additional (replacement) measurements for the signal points for which the base signal also provides signal values, the additional measurements being performed for example after detecting that the measurements for those signal points in the base signal contained errors. As another example, the replacement values may be the results of extrapolation or interpolation for those signal points, based on values for other signal points in the base signal. A derivation tree may define multiple levels of such changes, each level defining replacement signal values for signal points from the preceding level. The signal points for which a level provides replacement values may be entirely different from those for which lower levels provide replacement values, or they may be the same, or there may be partial overlap. A derivation tree may consist entirely of changes.

When a signal is defined by means of a derivation from the base signal that involves using data values of the base signal for all signal points in the base signal except for those signal points for which replacement values are provided, at least the replacement signal values for the signal points are stored in storage device 12 for the signal. To define such a signal, only the changed values need be stored in storage device 12. In combination with a reference to the predecessor signal this completely defines the version of the signal that is obtained by replacing the signal values of those signal points for which replacement values are provided.

When the derivations correspond to a change of signal values Interface 16 may extract, in first step 31
(a) a time range specified in the request,
(b) a root signal,
(c) an identification of the derivation of the requested signal from the root signal, wherein the derivation defines a change in terms of a set of replacement signal values in storage device 12, to be used as replacement values for signal values for signal points in a predecessor signal.

The definition of the derivation may be defined by means of a set of changed signal values. These signal values will be stored in storage device 12. When a plurality of derived signals is defined by means of changes, successively based on other derived signal, a sequence of a plurality of such sets of changes signal values in storage device 12. In this case different sets may define changed values for the same signal points. When signals values of a signal is requested, the signal value for a signal point is used that is changed last for the signal point in a chain of such derivations.

Each defined signal effectively defines a version of an underlying version of the signal, expressed by a set of changed signal values in storage device 12. The new version is obtainable by replacing the signal values of that underlying version by values from the set of changed signal values in storage device 12 at the signal points for which the set provides changed signal values. One set may be defined, resulting in a signal version of the root signal, wherein selected signal values of the root signal are changed.

When data values of a changed signal version are requested, processor 18 checks the availability of a changed value for a signal point in third step 33. If the changed value for the signal point is available, processor 18 passes the signal point back to the interface 16 which performs fourth step 35. In fifth step 35 interface 16 checks whether the end of the requested time range is reached.

If step 33 shows that a changed value for the signal point is not available, processor 18 performs sixth step 36 for the signal point. In sixth step 36, processor 18 retrieves a signal value for the signal point from storage device 12, if such a value is available for the signal point or from a predecessor signal if not, until the root signal is reached.

In another embodiment the request may indicate a plurality of signal point ranges (e.g. time ranges). This may be achieved by splitting the request in a number of the single time range requests and then concatenating the resulting responses into the single one.

Although derived signal data obtained by applying a signal processing operation may be stored for all nodes of a derivation, this is not necessary. In an embodiment signal data for none of the signals derived from a root node or only part of the derived signals is stored, no data being stored for at least part of the nodes that represent signals derived by executing signal processing operations. In this case, changes (sets of updated values) of these derived signals may be stored even though the derived signals that are changed are not stored at all. Because processor 18 is able to construct the derived signal based on the indicated derivation entire requested signals can be constructed in this way.

Although the process has been described for time dependent signals, for example audio signals, or time dependent sensor output signals, such as from temperature sensors, flow sensors, position sensors (e.g. GPS receiver output signals) etc, it can also be applied to position dependent signals such as image signals, signals from an array of sensors at different spatial locations or position and time dependent data such as video signals. In this case the indication of the transition time point may be replaced by another indication of a border in the set of points for which signal data is provided, such as an indication of a transition position, or a line of transitions points that separates ranges of positions and/or time values for which the requested signal should be obtained by different derivations.

The operations of interface 16 and/or processor 18 may be executed by a programmable processing system (which may be a single processor or a combination of processors operating in parallel), under control of a computer program for causing the described steps to be execute. Such a computer program may be supplied on a computer readable medium, such as a magnetic or optical disk or a semi-conductor memory. An access system is provided for accessing signal data, the access system comprising a connection to a storage device; a signal processing circuit; an interface configured to receive an access request, and to extract, from the access request, an identification of a base signal and an identification of a derivation to obtain a requested signal from the base signal, wherein the interface is configured to test whether stored signal data obtained from the base signal by said derivation is available in the storage device, and if so to return the stored signal data in response to the access request, and if not to cause the signal processing circuit to derive signal data from further stored signal data by application of at least one signal processing operation identified in said derivation and to return the derived signal data from the signal processing circuit in response to the access request.

In an embodiment the requested signal has signal values for a series of signal points, and the interface is configured to test whether stored signal data obtained from the base signal by said derivation for individual signal points or ranges of signal points within said series is available in the storage device, and to return the stored signal data in response to the access request for a part of the signal points or ranges of signal points for which said stored signal data is available, and return the derived signal data for a further part of the signal points or ranges of signal points.

In an embodiment, the interface is configured to extract a series of indications of derivation operation types from the identification of the derivation, the requested signal being obtainable from the base signal by successive application of the derivation operation types in said series, the interface being configured to test whether said further stored signal data is available for an intermediate signal obtained from the base signal by successive application of a first part of the derivation operation types in said series, and if so to cause the signal processing circuit to apply a remainder of the derivation operation types in said series to the further stored signal data.

In an embodiment, the interface is configured to cause the signal processing circuit to use stored signal data of the base signal as said further stored signal data at least when no intermediate signal data obtained by applying part of the derivation is stored in the storage device.

In an embodiment, the interface is configured to extract, from the access request, an indication of a border, and an indication of a first signal to be produced for points on a first side of said border to return signal data of the first signal for points on a first side of said border in response to the access request and to return the stored signal data or the derived signal data for points on a second side of the border.

In an embodiment, the interface is configured to extract, from the access request, the indication of the first signal in terms of an identification of the base signal or an intermediate derivation to obtain the first signal from the base signal, the interface being configured to extract, from the access request, an indication of a supplementary derivation, the derivation of the requested signal being composed of the intermediate derivation followed by the supplementary derivation.

An embodiment comprises the storage device. An embodiment comprises a sensor coupled signal the storage device for storing sensor data in said storage device, the base signal being a signal of data from the sensor.

A method of providing access system to signal data is provided, the method comprising storing signal data from a sensor in a storage device; receiving an access request at an interface of an access system, extracting, from the access request, an identification of a base signal indicating the signal data from said sensor and an identification of a derivation to obtain a requested signal from the base signal; testing whether stored signal data obtained from the base signal by said derivation is available in the storage device, and if so returning the stored signal data in response to the access request via the interface, and if not deriving signal data from further stored signal data by at least one signal processing operation identified in said derivation and returning the derived signal data from the signal processing circuit in response to the access request via the interface.

An embodiment comprises testing whether stored signal data obtained from the base signal by said derivation is available in the storage device for individual signal points or ranges of signal points and returning the stored signal data in response to the access request for a part of the signal points or ranges of signal points for which said stored signal data is available, and return the derived signal data for a further part of the signal points or ranges of signal points.

An embodiment comprises extracting a series of indications of derivation operation types from the identification of the derivation, the requested signal being obtainable from the base signal by successive application of the derivation operation types in said series, testing whether said further stored signal data is available for an intermediate signal obtained from the base signal by successive application of a first part of the derivation operation types in said series, and if so to applying a remainder of the derivation operation types in said series to the further stored signal data.

An embodiment comprises using stored signal data of the base signal as said further stored signal data at least when no intermediate signal data obtained by applying part of the derivation is stored in the storage device.

An embodiment comprises extracting, from the access request, an indication of a border, and an indication of a first signal to be produced for points on a first side of said border returning signal data of the first signal for points on a first side of said border in response to the access request and returning the stored signal data or the derived signal data for points on a second side of the border.

An embodiment comprises extracting, from the access request, the indication of the first signal in terms of an identification of the base signal or an intermediate derivation to obtain the first signal from the base signal, extracting, from the access request, an indication of a supplementary derivation, the derivation of the requested signal being composed of the intermediate derivation followed by the supplementary derivation.

A computer program product is provided comprising a program of instructions for a programmable processing system that, when executed by the programmable processing system, will cause the programmable processing system to execute one or more of the methods described in the preceding paragraphs.

The invention claimed is:

1. An access system for accessing signal data, the access system comprising
   a connection to a storage device;
   a signal processing circuit;
   an interface configured to receive an access request for a requested signal having signal values for a series of signal points indicated by the access request, and to extract, using the access request, an identification of a base signal and an identification of replacement of signal values for individual signal points by replacement values, to obtain a requested signal from the base signal,
   wherein the interface is configured to
   test whether stored signal data defining the replacement of signal values for individual signal points or ranges of signal points within the series of signal points indicated by the access request is available in the storage device, and if so to
   include the stored signal data in a response to the access request for a part of the signal points or ranges of signal points for which said stored signal data is available, and to
   cause the signal processing circuit to retrieve further stored signal data defined for the base signal and to
   include, based on a result of said test, from the signal processing circuit in the response to the access request, the retrieved further stored signal data for a further part of the signal points or ranges of signal points outside the part of the signal points or ranges of signal points for which said test has determined that said stored signal data is available.

2. An access system according to claim 1, wherein the interface is configured to determine a series of indications of replacements of signal values for individual signal points by replacement values, the requested signal being obtainable from a root signal by successive application of the replacements in said series, the base signal resulting from applying a first part of the series of replacements to a root signal, the interface being configured to
   test for stored signal data defining a last replacement of signal values in said series of indications for individual signal points or ranges of signal points within the series of signal points indicated by the access request,
   include the stored signal data for the last replacement for each individual signal point if available for that individual signal point and stored signal data for the root signal for that individual signal point otherwise.

3. An access system according to claim 1, wherein the interface is configured to cause the signal processing circuit to use stored signal data of the base signal as said further stored signal data at least for those signal points where replacements defined for an intermediate signal or replacements defined for the requested signal are stored in the storage device.

4. An access system according to claim 1, wherein the interface is configured to extract, from the access request, an indication of a border, and an indication of a first signal to be produced for points on a first side of said border and to return signal data of the first signal for points on a first side of said border in response to the access request and to return the stored signal data defining replacements of signal values for individual signal points or ranges of signal points within said series or the retrieved further stored signal data for the further part for points on a second side of the border.

5. An access system according to claim 4, comprising the storage device.

6. An access system according to claim 5, comprising a sensor coupled signal the storage device for storing sensor data in said storage device, the base signal being a signal with data values obtained from the sensor.

7. An access system according to claim 6, wherein the system is configured to obtain the replacements of signal values for individual signal points from the sensor.

8. A method of providing access system to signal data, the method comprising
storing signal data from a sensor in a storage device;
receiving, at an interface of an access system, an access request for a requested signal having signal values for a series of signal points indicated by the access request,
extracting, using the access request, an identification of a base signal indicating the signal data from said sensor and an identification of replacements of signal values for individual signal points by replacement values from the base signal;
testing whether stored signal data defining replacements of signal values for individual signal points or ranges of signal points within the series of signal points indicated by the access request is available in the storage device, and if so including, based on a result of said test, the stored signal data in a response to the access request via the interface for a part of the signal points or ranges of signal points for which said test has determined that said stored signal data is available, and if not
retrieving, based on a result of said test, further signal data from further stored signal data for the base signal for a further part of the signal points or ranges of signal points outside the part of the signal points or ranges of signal points for which said test has determined that said stored signal data is available and
including the retrieved further signal data in the response to the access request via the interface.

9. A method according to claim 8, comprising
extracting a series of indications of replacements of signal values for individual signal points by replacement values, the requested signal being obtainable from a root signal by successive application of the replacements in said series, the base signal resulting from applying a first part of the series of replacements to a root signal,
testing for stored signal data defining a last replacement of signal values in said series of indications for individual signal points or ranges of signal points within the series of signal points indicated by the access request;
include the stored signal data for the latest replacement for each individual signal point if available for that individual signal point and stored signal data for the root signal for that individual signal point otherwise.

10. A method according to claim 8, comprising
extracting, from the access request, an indication of a border, and an indication of a first signal to be produced for points on a first side of said border
returning signal data of the first signal for points on a first side of said border in response to the access request and returning the stored signal data or the derived signal data for points on a second side of the border.

11. A method according to claim 10, comprising
extracting, from the access request, the indication of the first signal in terms of an identification of the base signal or intermediate replacements of signal values for individual signal points to obtain the first signal from the base signal,
extracting, from the access request, an indication of a supplementary replacement, a derivation of the requested signal being composed of the intermediate replacements followed by the supplementary replacements.

12. A method according to claim 8, comprising
obtaining the replacement values from a sensor;
storing the replacement values from a sensor in the storage device for use in response to the request.

13. A non-transitory computer readable medium having a computer program embodied thereon, the computer program including instructions for a programmable processing system that, when executed by the programmable processing system, will cause the programmable processing system to execute the steps of
storing signal data from a sensor in a storage device;
receiving, at an interface of an access system, an access request for a requested signal having signal values for a series of signal points indicated by the access request,
extracting, using the access request, an identification of a base signal indicating the signal data from said sensor and an identification of replacements of signal values for individual signal points by replacement values from the base signal;
testing whether stored signal data defining replacements of signal values for individual signal points or ranges of signal points within the series of signal points indicated by the access request is available in the storage device, and if so including, based on a result of said test, the stored signal data in a response to the access request via the interface for a part of the signal points or ranges of signal points for which said test has determined that said stored signal data is available, and if not
retrieving, based on a result of said test, further signal data from further stored signal data for the base signal for a further part of the signal points or ranges of signal points outside the part of the signal points or ranges of signal points for which said test has determined that said stored signal data is available and
including the retrieved further signal data in the response to the access request via the interface.

* * * * *